(12) United States Patent
Uh

(10) Patent No.: US 8,482,870 B2
(45) Date of Patent: Jul. 9, 2013

(54) LENS MODULE AND WAFER LEVEL LENS MODULE MANUFACTURING APPARATUS

(75) Inventor: Ji Ho Uh, Songpa-gu (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 13/111,233

(22) Filed: May 19, 2011

(65) Prior Publication Data

US 2011/0286118 A1   Nov. 24, 2011

(30) Foreign Application Priority Data

May 20, 2010   (KR) .................. 10-2010-0047317

(51) Int. Cl.
*G02B 7/02*   (2006.01)

(52) U.S. Cl.
USPC .......................................... 359/819; 359/811

(58) Field of Classification Search
USPC ................ 359/694–704, 811–830, 642
See application file for complete search history.

(56) References Cited

U.S. PATENT DOCUMENTS

| | | | | |
|---|---|---|---|---|
| 2010/0181691 | A1* | 7/2010 | Yoshida | 264/1.36 |
| 2011/0096213 | A1* | 4/2011 | Hasegawa | 348/294 |
| 2011/0211102 | A1* | 9/2011 | Yamada et al. | 348/302 |
| 2011/0222173 | A1* | 9/2011 | Chen | 359/819 |

FOREIGN PATENT DOCUMENTS

| | | |
|---|---|---|
| JP | 2009-251366 | 10/2009 |
| WO | WO 2009/076790 | 6/2009 |

OTHER PUBLICATIONS

Office Action for corresponding Japanese Application No. 10-2010-0047317 dated Oct. 25, 2011.

* cited by examiner

*Primary Examiner* — Mohammed Hasan
(74) *Attorney, Agent, or Firm* — Harness, Dickey & Pierce, P.L.C.

(57) ABSTRACT

Example embodiments are directed to a lens module manufactured from a wafer and a wafer level lens module manufacturing apparatus. The wafer level lens module manufacturing apparatus to mold lenses on a wafer provided with lens holes includes a first master substrate and a second master substrate disposed such that the wafer is between the first master substrate and the second master substrate. The wafer level lens module manufacturing apparatus also includes lens molding parts that enter the lens holes and are on at least one of the first master substrate and the second master substrate. The lens is molded to have a thickness less than that of the wafer using the first lens molding parts and second lens molding parts, and both surfaces of the lens are inside the lens hole. Therefore, even if wafers provided with lenses are stacked on each other, the lens does not contact the surfaces of the neighboring wafers or the lenses molded on the neighboring wafers.

12 Claims, 10 Drawing Sheets

LENS MODULE AND WAFER LEVEL LENS MODULE MANUFACTURING APPARATUS

CROSS-REFERENCE TO RELATED APPLICATION

This application claims priority under 35 U.S.C. §119 to Korean Patent Application No. 2010-0047317, filed on May 20, 2010 in the Korean Intellectual Property Office, the entire disclosure of which is incorporated herein by reference.

BACKGROUND

1. Field

Example embodiments relate to a lens module manufactured from a wafer and a wafer level lens module manufacturing apparatus.

2. Description of the Related Art

In modern electronics, a small camera is installed in small-scale portable electronic equipment, such as, a cellular phone, and several lenses in a stack-like structure are used in the small camera.

Lenses used in the small camera have a small size corresponding to the size of the small camera. In order to manufacture these lenses used in the small camera, a wafer level lens module manufacturing method is used, wherein a plurality of lenses are molded on a glass wafer in the shape of a circular plate and then the wafer is cut into a plurality of lens modules.

SUMMARY

According to an example embodiment, a lens module includes a wafer having at least one lens hole, and a lens of a transparent material inside the at least one lens hole, wherein a thickness of the lens is less than a thickness of the wafer and both surfaces of the lens are inside the at least one lens hole.

According to an example embodiment, the wafer includes an opaque material.

According to an example embodiment, the wafer is of a transparent material, and a layer of an opaque material is on at least a portion of at least one surface of the wafer adjacent to the at least one lens hole.

According to an example embodiment, the lens includes a lens part configured to change a path of light, and a support part at a periphery of the lens part and supported by the inner surface of the at least one lens hole.

According to an example embodiment, prominences or depressions are on the inner surface of the at least one lens hole.

According to an example embodiment, a plurality of lens holes are on the wafer, and the lens is in each of the plurality of lens holes, and the lens module is a portion of the wafer that is cut adjacent to the plurality of lens holes, each of the lens holes including the lens disposed therein.

According to an example embodiment, the lens includes a lens part configured to change a path of light, and does not include a support part at a periphery of the lens part and supported by the inner surface of the at least one lens hole.

According to an example embodiment, a wafer level lens module manufacturing apparatus to mold lenses on a wafer including lens holes includes a first master substrate, a second master substrate, the wafer being between the first master substrate and the second master substrate, and a plurality of lens molding parts on at least one surface of at least one of the first master substrate and the second master substrate, the plurality of lens molding parts configured to enter the lens holes.

According to an example embodiment, the plurality of lens molding parts include first lens molding parts protruding from the first master substrate, and second lens molding parts protruding from the second master substrate.

According to an example embodiment, the wafer, the first master substrate and the second master substrate are circular in shape.

According to an example embodiment, the wafer, the first master substrate and second master substrate are rectangular in shape.

According to an example embodiment, the plurality of lens molding parts on one of the first or second master substrate have a concave shape and the plurality of lens molding parts on the other of the first or second master substrate have a convex shape.

According to an example embodiment, the plurality of lens molding parts on one of the first or second master substrate have either a concave shape or a convex shape and the plurality of lens molding parts on the other of the first or second master substrate are flat.

According to an example embodiment, the plurality of lens molding parts on the first and second master substrates have a same shape.

BRIEF DESCRIPTION OF THE DRAWINGS

The above and other features and advantages will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
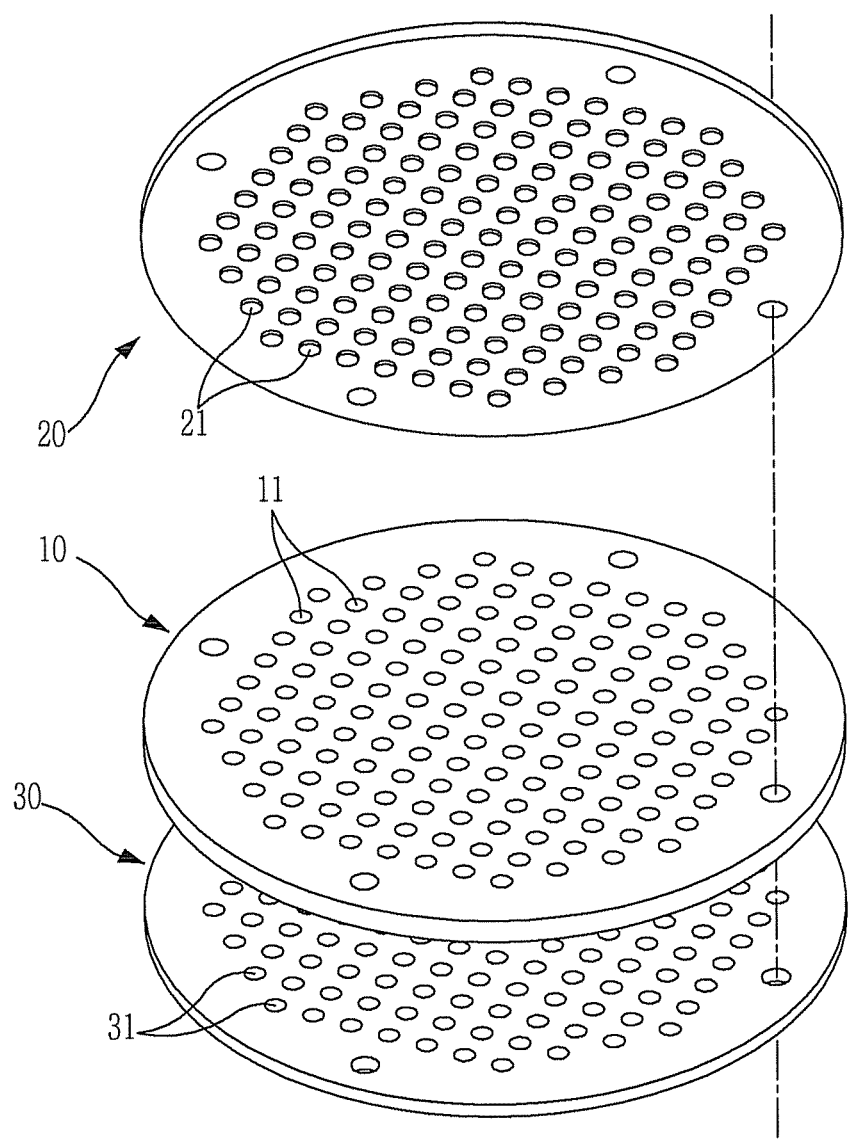
FIG. 1 is a perspective view illustrating a structure of a wafer level lens module manufacturing apparatus according to an example embodiment.

Detailed example embodiments are disclosed herein. However, specific structural and functional details disclosed herein are merely representative for purposes of describing example embodiments. Example embodiments may, however, be embodied in many alternate fauns and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular aims disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these tee ms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, a wafer level lens module manufacturing apparatus according to an example embodiment will be described in detail with reference to the accompanying drawings.

Figure 4:
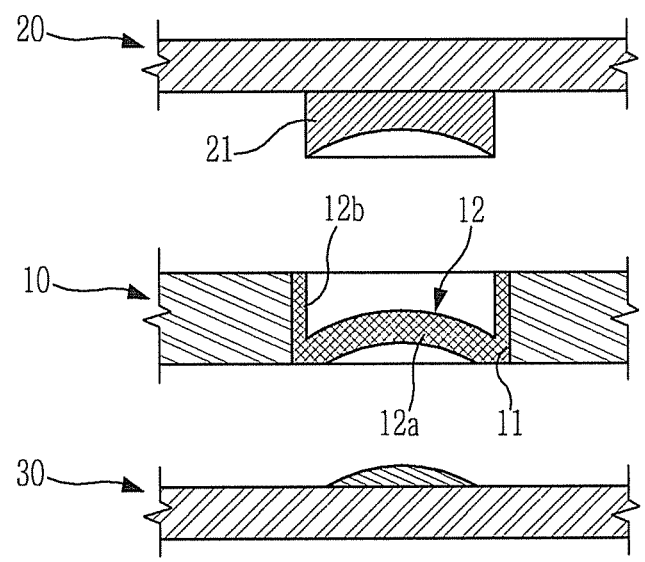

As shown in FIG. 1, the wafer level lens module manufacturing apparatus includes a first master substrate 20 and a second master substrate 30 to mold lenses 12 (with reference to FIG. 4). A wafer 10 to mold the lenses 12 is disposed between the first master substrate 20 and the second master substrate 30, and the lenses 12 are molded on the wafer 10 by the first master substrate 20 and the second master substrate 30.

A plurality of lens holes 11 in which the lenses 12 are molded are provided on the wafer 10. Lens molding parts 21 and 31, which enter the lens holes 11 as the first master substrate 20 and the second master substrate 30 are closely adhered to both surfaces of the wafer 10, protrude from the first master substrate 20 and the second master substrate 30, respectively. The lens molding parts 21 provided on the first master substrate 20 are referred to as first lens molding parts 21, and the lens molding parts 31 provided on the second master substrate 30 are referred to as second lens molding parts 31.

According to an example embodiment, the wafer 10 is made of an opaque material so as to prevent transmission of light through regions other than the lens holes 11. Front ends (for example, the ends of first lens molding parts 21 away from the master substrate 20) of the first lens molding parts 21 provided on the first master substrate 20 are formed in a concave shape, for example and front ends (for example, the ends of the second lens molding part 31 away from the master substrate 31) of the second lens molding parts 31 provided on the second master substrate 30 are formed in a convex shape, for example, thereby molding the lenses 12 in a meniscus shape, one surface of which is convex and the other surface of which is concave.

Hereinafter, a process of manufacturing a lens module 100 using the above wafer level lens module manufacturing apparatus will be described with reference to the accompanying drawings.

Figure 2:
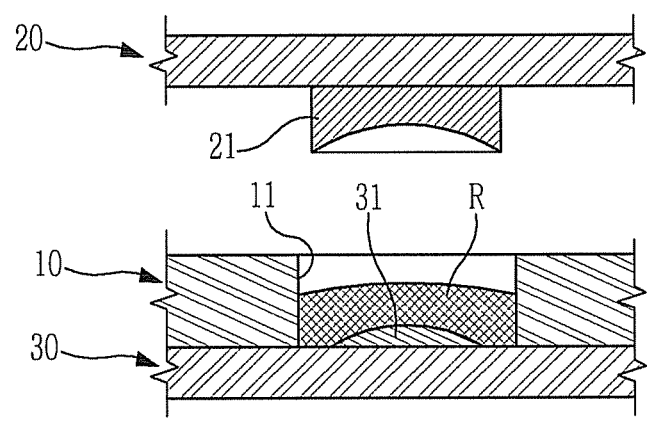
FIGS. 2 to 4 are sectional views illustrating a process of manufacturing a lens module using the wafer level lens module manufacturing apparatus according to an example embodiment.
Figure 3:
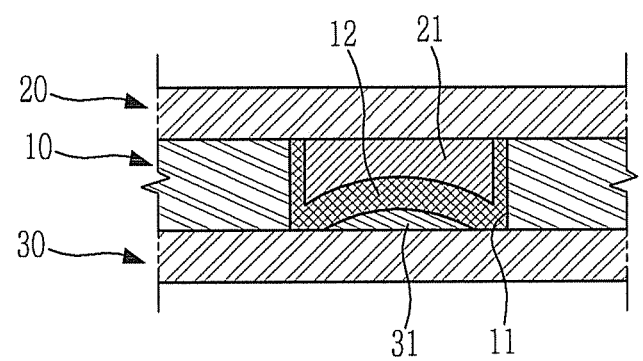

First, as shown in FIG. 2, after the second master substrate 30 is closely attached to the lower surface of the wafer 10, inner spaces of the lens holes 11 are filled with a resin R. Then, as shown in FIG. 3, when the first master substrate 20 is closely attached to the upper surface of the wafer 10, the first lens molding parts 21 and the second lens molding parts 31 respectively enter the lens holes 11, and the resin R filling the inner spaces of the lens holes 11 is deformed into a shape corresponding to the space between the first lens molding parts 21 and the second lens molding parts 31.

When the resin R is cured under the above state, the lenses 12 having a shape corresponding to the space between the first lens molding parts 21 and the second lens molding parts 31 are molded. After the lenses 12 are molded in the lens holes 11, the wafer 10 is separated from the first master substrate 20 and the second master substrate 30. Thereby, the molding of the lenses 12 on the wafer 10 is completed.

According to an example embodiment, each of the lenses 12 manufactured by the above process includes a lens part 12a (FIG. 4) to refract light entering the lens hole 11 to change a path of the light, and a support part 12b formed around the periphery of the lens part 12a and supported by the inner surface of the lens hole 11 to maintain the installed state of the lens 12 within the lens hole 11.

Figure 5:
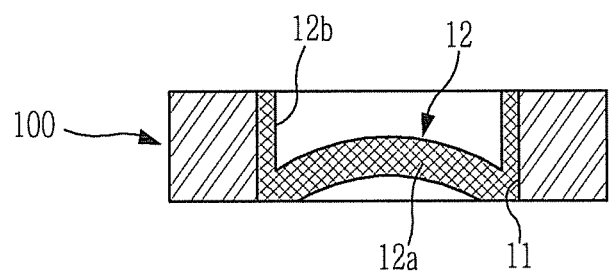
FIGS. 5 to 9 are example embodiments of lens modules manufactured by the wafer level lens module manufacturing apparatus.

After the molding of the lenses 12 is completed, the wafer 10 is cut into the individual lenses 12, each of which includes a partial region of the wafer 10 adjacent to the corresponding lens hole 11. Thereby, the manufacture of the lens module 100, as shown in FIG. 5, is completed.

When the lens 12 is molded by the lens molding parts 21 and 31 entering the lens hole 11, as described above, the lens 12 having a thickness less than that of the wafer 10 is obtained and thus both surfaces of the lens 12 are inside the lens hole 11. Therefore, the thickness of the lens 12 may be reduced. Also, since the lens 12 does not contact the surfaces of the neighboring wafers 10 or the lenses 12 molded on the neighboring wafers 10 when the wafers 10 provided with the lenses 12 are stacked on each other, the wafers 10 provided with the lenses 12 may be stacked on each other with relative ease. Further, the plural lenses 12 may be arranged in a line by attaching the wafers 10 provided with the lenses 12 to each other, and thus a lens assembly formed by combining lenses 12 of various shapes may be manufactured.

Figure 6:
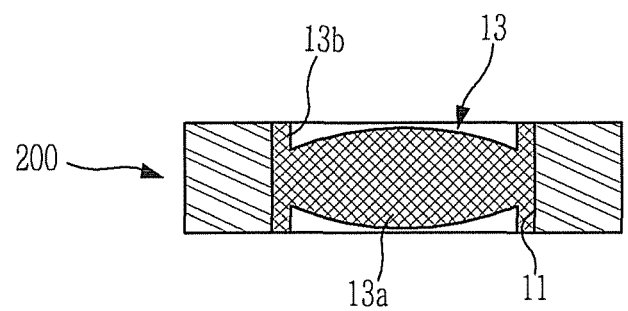
Figure 7:
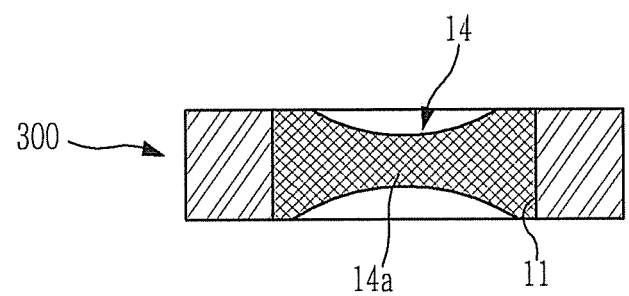

According to an example embodiment, the lens module 100 is formed in a meniscus shape, one surface of the lens part 12a of which is convex and the other surface of the lens part 12a of which is concave. However, the shape of the lens module 100 is not limited thereto. That is, a lens module 200 may be fanned in a shape, wherein both surfaces of a lens part 13a of a lens 13 convex, as shown in FIG. 6, or a lens module 300 may be formed in a shape, wherein both surfaces of a lens part 14a of a lens 14 are concave, as shown in FIG. 7.

Further, although the lenses 12 and 13 include a lens part 12a or 13a and/or a support part 12b or 13b, the lenses 12 and 13 are not limited thereto. That is, as shown in FIG. 7, the lenses 14 may include only a lens part 14a without a support part according to the shape of the lenses 14.

Figure 8:
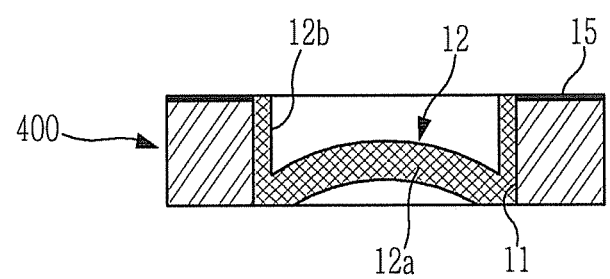

Further, although the wafer 10 made of an opaque material to prevent light from passing through regions of the wafer 10 other than the lens holes 11, the material of the wafer 10 is not limited thereto. That is, as shown in FIG. 8, a lens module 400 uses a wafer 10 made of a transparent material, and a layer 15 made of an opaque material, such as chrome (Cr), is formed on one surface of the wafer 10 adjacent to the lens holes 11, thereby preventing light from passing through regions of the wafer 10 other than the lens holes 11.

Figure 9:
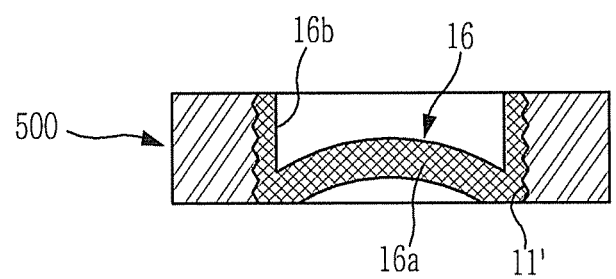

Further, although example embodiments illustrate the lens holes 11, having a rectilinear inner surface, the inner surfaces of the lens holes 11 are not limited thereto. That is, as shown in FIG. 9, each of lens holes 11' may have an uneven inner surface with prominences and/or depressions, thereby maintaining a relatively more stable supported state of support parts 16b of lenses 16 by the inner surfaces of the lens holes 11'.

Figure 10:
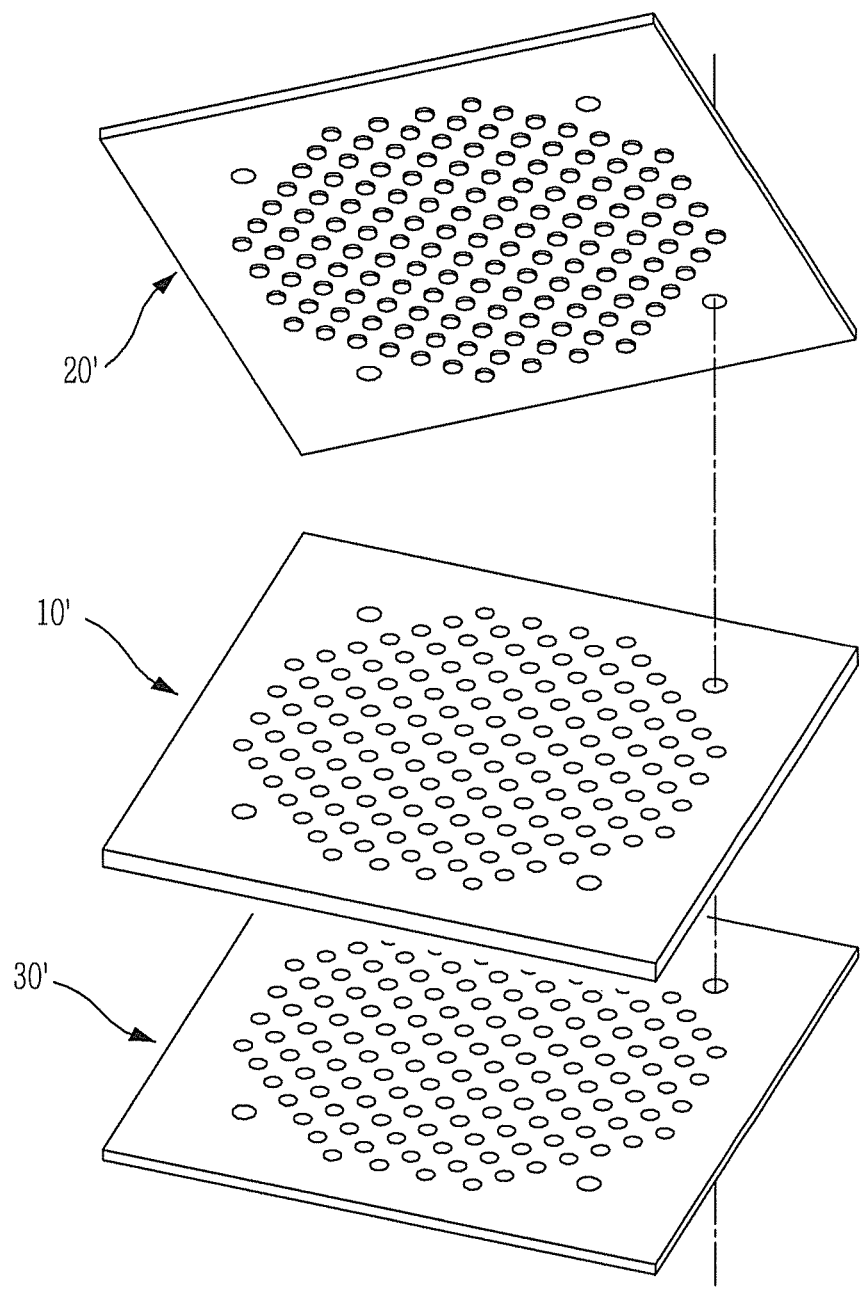
FIG. 10 is a perspective view illustrating a structure of a wafer level lens module manufacturing apparatus according to another example embodiment.

Although example embodiments use the wafer 10 processed in the shape of a circular plate, the shape of the wafer 10 is not limited thereto. That is, as shown in FIG. 10, the wafer 10 processed in the shape of a rectangular plate is used. If the rectangular plate-shaped wafers 10 are used, the wafers 10 may be aligned by aligning ends of the wafers 10, and thus alignment keys provided on the wafers 10 to align the wafers 10 or a microscope to check the alignment keys may be omitted.

Further, although example embodiments illustrate the first lens molding parts 21 and the second lens molding parts 31 provided on the first master substrate 20 and the second master substrate 30, respectively, mold a lens having a meniscus shape, the first lens molding parts 21 and the second lens molding parts 31 are not limited thereto. That is, if required, any one of the first lens molding parts 21 and the second lens molding parts 31 may be formed on any one of the first master substrate 20 and the second master substrate 30 so as to allow one surface of each of the lens parts 12a to be concave or convex and the other surface of each of the lens parts 12a to be flat.

According to example embodiments, a lens is provided in a lens hole, and thus the thickness of the lens is reduced to be less than the thickness of a wafer, thereby allowing the lens module to have a smaller thickness.

Further, even if wafers provided with lenses are stacked on each other without any separate member between the wafers, the lens do not rub against the neighboring wafers or the lenses on the neighboring wafers, and thus the wafers provided with the lenses are managed with relative ease.

Moreover, plural lens modules may be bound to each other, and thus manufacture of a lens assembly obtained by combining plural lenses is simple.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A lens module comprising: a wafer including at least one lens hole; and a lens of a transparent material inside the at least one lens hole, wherein a thickness of the lens is less than a thickness of the wafer and both surfaces of the lens are inside the at least one lens hole; wherein the lens includes: a lens part configured to change a path of light; and a support part at a periphery of the lens part and supported by the inner surface of the at least one lens hole.

2. The lens module according to claim 1, wherein the wafer includes an opaque material.

3. The lens module according to claim 1, wherein: the wafer is of a transparent material; and a layer of an opaque material is on at least a portion of at least one surface of the wafer adjacent to the at least one lens hole.

4. The lens module according to claim 1, wherein prominences or depressions are on the inner surface of the at least one lens hole.

5. The lens module according to claim 1, wherein: a plurality of lens holes are on the wafer, and the lens is in each of the plurality of lens holes; and the lens module is a portion of the wafer that is cut adjacent to the plurality of lens holes, each of the lens holes including the lens disposed therein.

6. The lens module according to claim 1, wherein the lens includes: a lens part configured to change a path of light; and does not include a support part at a periphery of the lens part and supported by the inner surface of the at least one lens hole.

7. A wafer level lens module manufacturing apparatus to mold lenses on a wafer including lens holes, comprising: a first master substrate; a second master substrate, the wafer being between the first master substrate and the second master substrate; and a plurality of lens molding parts on at least one surface of at least one of the first master substrate and the second master substrate, the plurality of lens molding parts configured to enter the lens holes; wherein the plurality of lens molding parts on one of the first or second master substrate have a concave shape and the plurality of lens molding parts on the other of the first or second master substrate have a convex shape.

8. The wafer level lens module manufacturing apparatus according to claim 7, wherein the plurality of lens molding parts include first lens molding parts protruding from the first master substrate, and second lens molding parts protruding from the second master substrate.

9. The wafer level lens module manufacturing apparatus according to claim 7, wherein the wafer, the first master substrate and the second master substrate are circular in shape.

10. The wafer level lens module manufacturing apparatus according to claim 7, wherein the wafer, the first master substrate and second master substrate are rectangular in shape.

11. The wafer level lens module manufacturing apparatus according to claim 7, wherein the plurality of lens molding parts on one of the first or second master substrate have either a concave shape or a convex shape and the plurality of lens molding parts on the other of the first or second master substrate are flat.

12. The wafer level lens module manufacturing apparatus according to claim 7, wherein the plurality of lens molding parts on the first and second master substrates have a same shape.

* * * * *